United States Patent [19]
Gage et al.

[11] Patent Number: 6,139,462
[45] Date of Patent: Oct. 31, 2000

[54] DIFFERENTIAL WITH LASER HARDENED CASE

[75] Inventors: Garrett W. Gage, Goodrich; Larry G. Haske, Fairgrove, both of Mich.

[73] Assignee: American Axle & Manufacturing, Inc., Detroit, Mich.

[21] Appl. No.: 09/140,872

[22] Filed: Aug. 27, 1998

[51] Int. Cl.$^7$ ................................................. F16H 48/10
[52] U.S. Cl. ...................................... 475/248; 74/606 R
[58] Field of Search ........................... 475/248; 74/606 R

[56] References Cited

U.S. PATENT DOCUMENTS

| | | |
|---|---|---|
| 4,017,708 | 4/1977 | Engel et al. . |
| 4,093,842 | 6/1978 | Scott . |
| 4,125,755 | 11/1978 | Plamquist . |
| 4,247,972 | 2/1981 | Hendrixon et al. . |
| 4,250,372 | 2/1981 | Tani . |
| 4,533,400 | 8/1985 | Benedict . |
| 4,539,461 | 9/1985 | Benedict et al. . |
| 4,617,070 | 10/1986 | Amende et al. . |
| 5,160,556 | 11/1992 | Hyde et al. . |
| 5,556,351 | 9/1996 | Hiraishi et al. . |

*Primary Examiner*—Dirk Wright
*Attorney, Agent, or Firm*—Harness, Dickey & Pierce, P.L.C.

[57] ABSTRACT

The present invention is directed to a method for hardening the gear pockets in a differential case through use of laser energy. As such, each gear pocket is left with a plurality of hardened tracks formed on its wall surface. The laser hardened tracks reduce the damaging effect of any wear condition experienced between the wall surface in the gear pockets and gears rotatably mounted therein.

14 Claims, 4 Drawing Sheets

DIFFERENTIAL WITH LASER HARDENED CASE

BACKGROUND OF THE INVENTION

1. Technical Field

The present invention relates generally to differentials for use in the driveline of a motor vehicle. In particular, the present invention is directed to a differential assembly having a differential case with laser hardened gear pockets.

2. Discussion

As is known, motor vehicles have driveline systems equipped with differentials which function to accommodate rotary speed differences between two rotary components such as, for example, a pair of axle shafts. Most typically, the differential includes a differential case, a pair of output shafts, and a gearset mounted in the differential case that is operable for transferring rotary power (i.e., drive torque) from the differential case to the output shafts while permitting speed differentiation between the output shafts. In parallel-axis helical differentials, the gearset includes a pair of side gears fixed for rotation with the output shafts and two or more sets of meshed pinion gears mounted in gear pockets formed in the differential case. In particular, each set of pinion gears includes a first pinion rotatably mounted in a first gear pocket and which is meshed with a second pinion gear rotatably mounted in a second gear pocket. The first pinion gear is also meshed with one of the side gears while the second pinion gear is meshed with the other side gears. The gear pockets extend longitudinally and are circumferentially arranged such that each pinion gear may rotate about its own axis parallel to the rotary axis of the differential case and the output shafts. When speed differentiation occurs between the output shafts, each pinion gear rotates about its own axis and is thrust into frictional engagement with the inner wall surface of the gear pocket to generate a differential limiting force. By way of example, a conventional differential assembly of the type disclosed is shown in U.S. Pat. No. 5,556,351.

In order to reduce wear between the pinion gears and the wall surface of the gear pockets, various surface hardening techniques have been employed. Most commonly, the gear pockets in the differential case are carburized or induction hardened. As is known, such localized surface hardening processes require that certain portions of the differential case must be masked to avoid hardening. Moreover, the subsequent quenching operation may cause the differential case to distort, which will then invariably require a final grinding operation to correct the distortion. It will be appreciated that use of the carburizing method to harden differential cases is both energy and labor intensive and, therefore, is quite expensive. In addition, the carburizing process requires a large amount of equipment including a furnace, custom quenching dies for each differential case, masking equipment, and grinding equipment.

Therefore, it would be desirable to provide a method for hardening the gear pockets and/or other portions of a differential case which is less expensive and time-consuming than prior art surface hardening methods.

SUMMARY OF THE INVENTION

The above and other objects are provided by a method for hardening the gear pockets of a differential case through use of laser energy. As a result of the laser hardening process, the inner wall surface of each gear pocket is left with a plurality of hardened tracks. The laser hardened tracks reduce the damaging effect of any wear condition experienced between the gear pockets and the pinion gears.

As a related object, the present invention is directed to a differential assembly having a differential case formed with gear pockets having one or more laser hardened tracks.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not to be considered limiting in scope, the invention will be described and explained with additional specificity and detail through the use of the accompanying drawings in which.

DETAILED DESCRIPTION OF THE PREFERRED EMBODIMENTS

The present invention is directed to an improved differential case for a differential assembly of the type used in motor vehicle drivetrain applications. The differential case of the present invention is fabricated to include surface hardened gear pockets which provide improved wear resistance without requiring modification of other components associated with the differential assembly. Thus, the differential case of the present invention may be utilized with a wide variety of differential assemblies and is not intended to be specifically limited to the particular application described herein.

Figure 1:
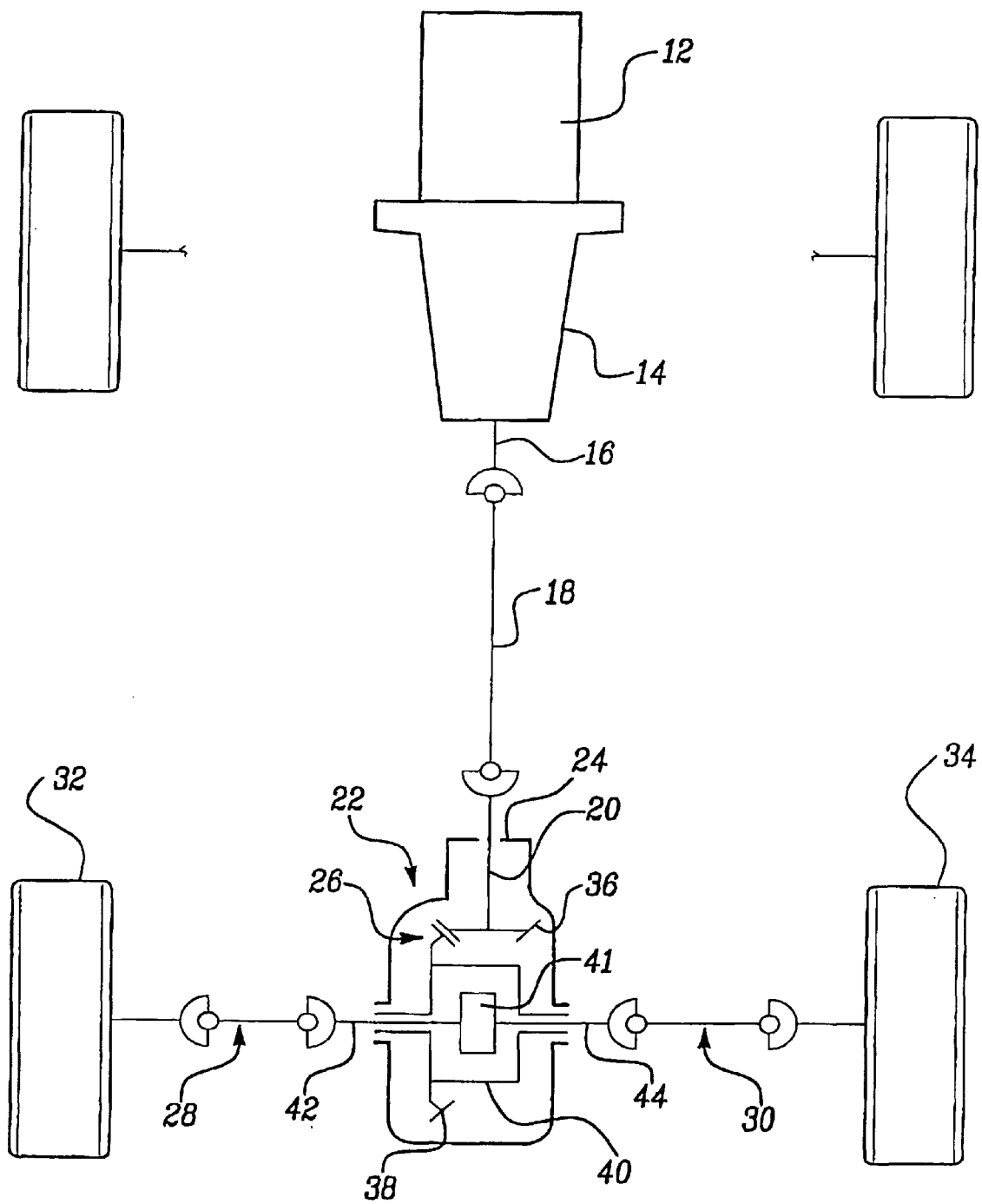
FIG. 1 is a schematic view of an exemplary motor vehicle drivetrain into which the differential assembly of the present invention is incorporated.

With particular reference now to FIG. 1, a drivetrain 10 for an exemplary motor vehicle is shown to include an engine 12, a transmission 14 having an output shaft 16, and a propeller shaft 18 connecting output shaft 16 to a pinion shaft 20 of a rear axle assembly 22. Rear axle assembly 22 includes an axle housing 24, a differential assembly 26 supported in axle housing 24, and a pair of axle shafts 28 and 30 respectively interconnected to left and right rear wheels 32 and 34. Pinion shaft 20 has a pinion gear 36 fixed thereto which drives a ring gear 38 that is fixed to a differential case 40 of differential assembly 26. A gearset 41 supported within case 40 transfers rotary power from case 40 to output shafts 42 and 44 respectively connected to axle shafts 28 and 30 and facilitates relative rotation (i.e., differentiation) therebetween. Thus, rotary power from engine 12 is transmitted to output shafts 42 and 44 for driving rear wheels 32 and 34 via transmission 14, prop shaft 18, pinion shaft 20, differential case 40 and gearset 41. While differential assembly 26 is shown in a rear-wheel drive application, the present invention is contemplated for use in differential assemblies installed in trailing axles, transaxles for use in front-wheel drive vehicles, transfer cases for use in four-wheel drive vehicles and/or any other known vehicular driveline application.

Figure 2:
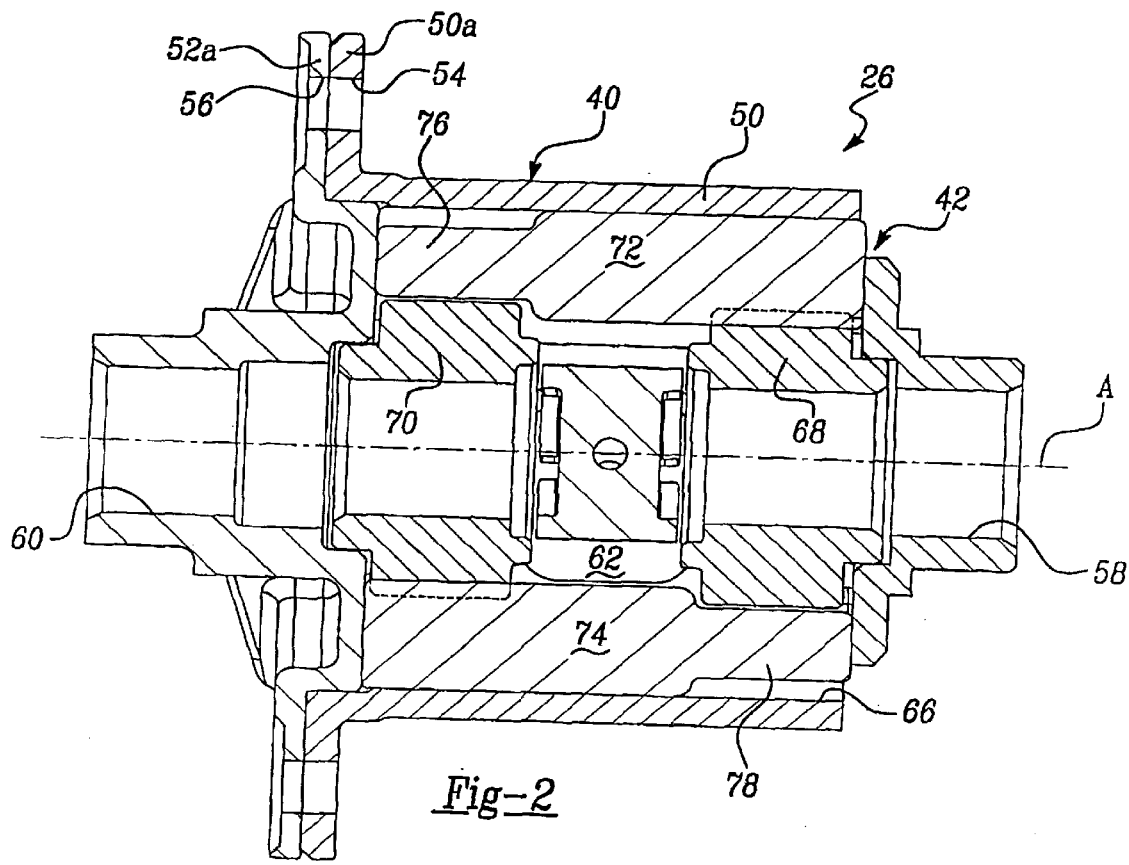
FIG. 2 is a sectional view of the differential assembly of the present invention.

Referring now to FIG. 2, the construction for differential assembly 26 will be described in greater detail. Differential case 40 includes a drum 50 and an end cap 52 having mating radial flanges 50a, 52a with aligned mounting apertures 54, 56 through which fasteners (not shown) extend to interconnect drum 50 to end cap 52 and also to interconnect ring gear 38 to case 40. Case 40 is supported for rotation about its axis "A" and defines a pair of axle shaft openings 58, 60 that communicate with a central chamber 62 formed in drum 50. Drum 50 also includes a plurality of axial bores, hereinafter referred to as gear pockets 64 and 66, which communicate with each other and with chamber 62. Pockets 64 and 66 are arranged circumferentially in sets and are parallel to rotary axis "A" of case 40.

Gearset 41 is supported in drum 50 and includes a first and second helical side gear 68 and 70, first helical pinion gears 72 rotatably retained in pockets 64 and meshed with first side gear 68, and second helical pinion gears 74 rotatably retained in pockets 66 and meshed with second side gear 70. In addition, once installed in gear pockets 64 and 66, one of first pinion gears 72 also meshes with one of second pinion gears 74 since they are arranged in meshed sets within pockets 64 and 66. As seen, first pinion gears 72 have a post segment 76 such that first pinion gears 72 are not meshed with second side gear 70. Likewise, second pinion gears 74 each have a post segment 78 such that second pinion gears 74 are not meshed with first side gear 68. As is conventional, first side gear 68 is rotatably supported in shaft opening 58 and is fixed to output shaft 44. Likewise, second side gear 70 is rotatably supported in shaft opening 60 and is fixed to output shaft 42.

Figure 3:
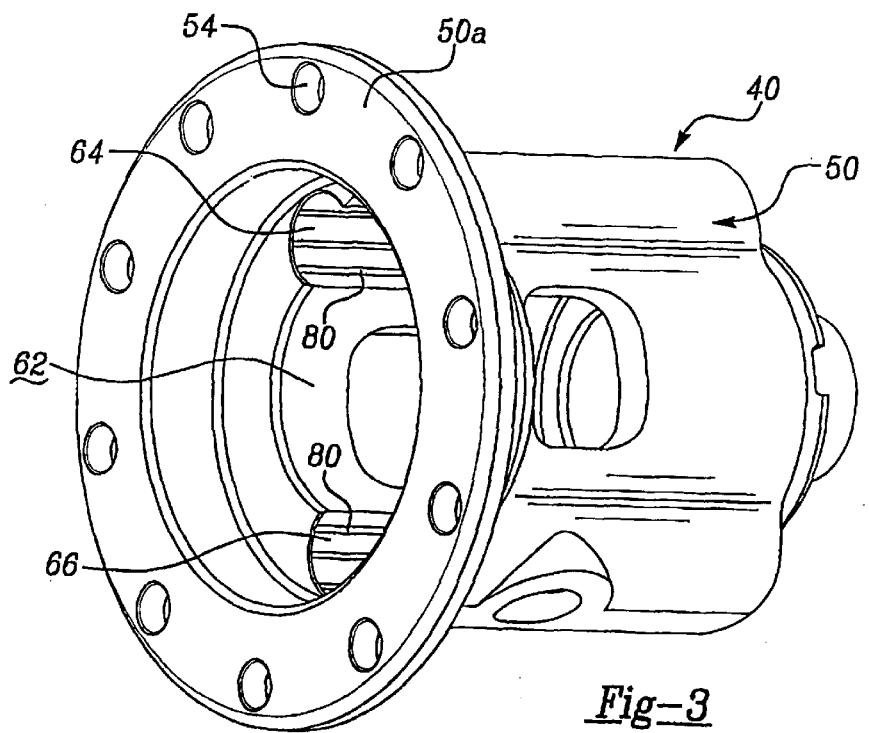
FIG. 3 is a perspective view of the differential case associated with the differential assembly shown in FIG. 2.
Figure 4:
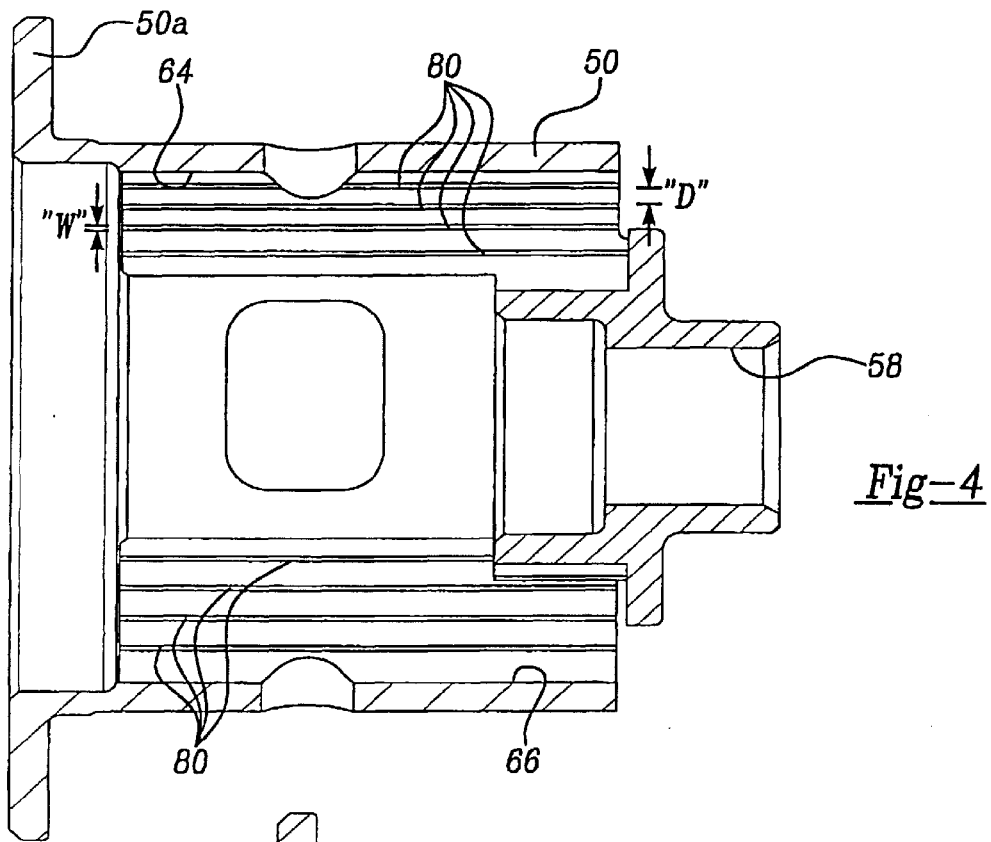
FIG. 4 is a sectional view taken through the differential case of FIG. 3 illustrating the laser hardened gear pockets made in accordance with a preferred embodiment of the present invention.

In order to reduce the wear between the teeth of pinion gears 72 and 74 and the respective wall surfaces of pockets 64 and 66, a plurality of hardened tracks 80 are formed within pockets 64 and 66. Hardened tracks 80 are shown in FIGS. 3 and 4 to extend longitudinally and be parallel to one another. Tracks 80 are separated by a distance "D". Preferably, the lateral spacing "D" between hardened tracks 80 is in the range of 0.5 to 5.0 mm and more preferred at approximately 3 mm. Also, the width of tracks 80 is identified as "W" and is preferably in the range of 0.5 to 5.0 mm and more preferred at approximately 3 mm.

In order to form hardened tracks 80, pockets 64 and 66 are first prepared for subsequent hardening by metal removal operations including, for example, a lathe or boring operation followed by honing. The surface of pockets 64 and 66 may have a roughness of 0.015 mm +/- 0.003 mm. As the next step, an absorption substance such as manganese phosphate is applied to the surface to be hardened, which will lower the incident reflection of laser light to a few percent. The next step in the process is the hardening of pockets 64 and 66 along the region of hardened tracks 80, by means of a laser beam, such that hardened tracks 70, have a martensitic structure in the edge zone.

A typical hardening laser, such as a 5 kilowatt carbon dioxide laser, may be utilized for producing one or more laser beams. The laser beam(s) is guided with respect to the wall surface of pockets 64 and 66 such that parallel, longitudinally extending, hardened tracks 80 will result. This is achieved by providing for longitudinal feed of drum 50 or the laser, respectively. The laser beam is preferably formed in an integrator which provides a hardened track 80 of essentially rectangular cross-section and a uniform distribution profile of beam intensity for hardening. The hardening depth can be controlled and, preferably, is in the range of about 0.5 mm to 1.3 mm.

Figure 5:
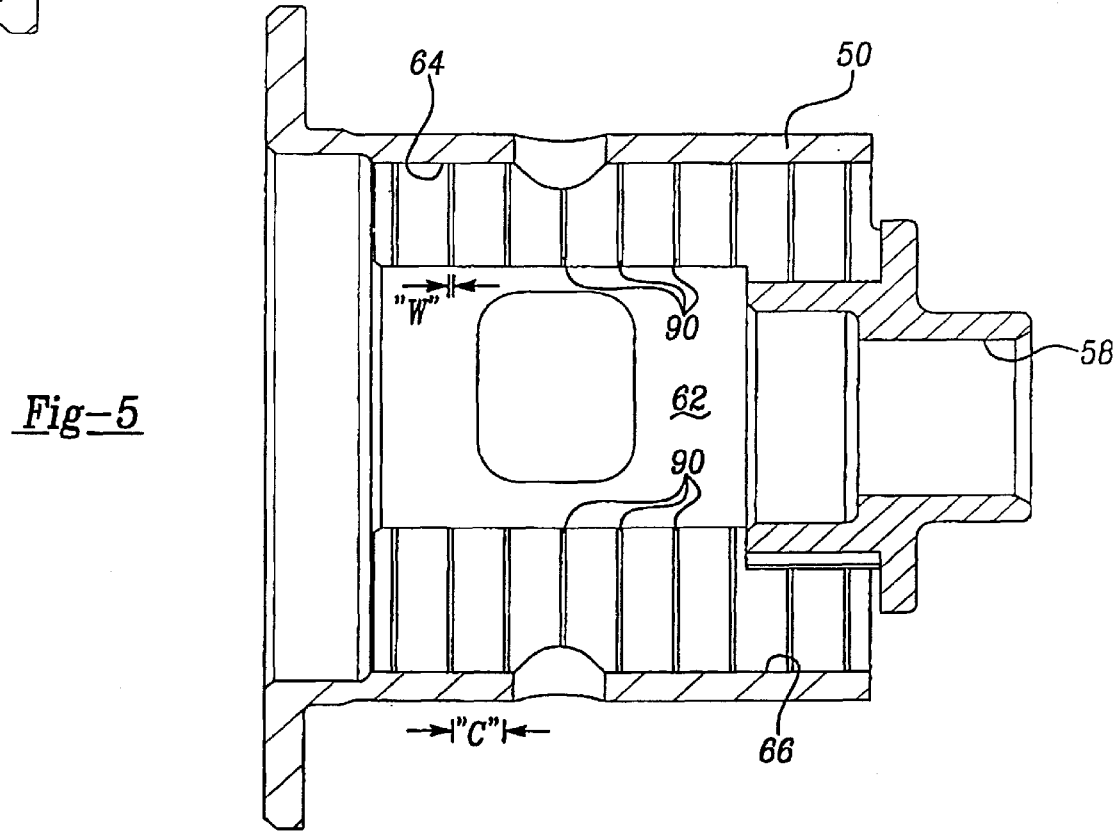
FIG. 5 is another sectional view of the differential case showing the laser hardened gear pockets made in accordance with an alternative preferred embodiment.
Figure 6:
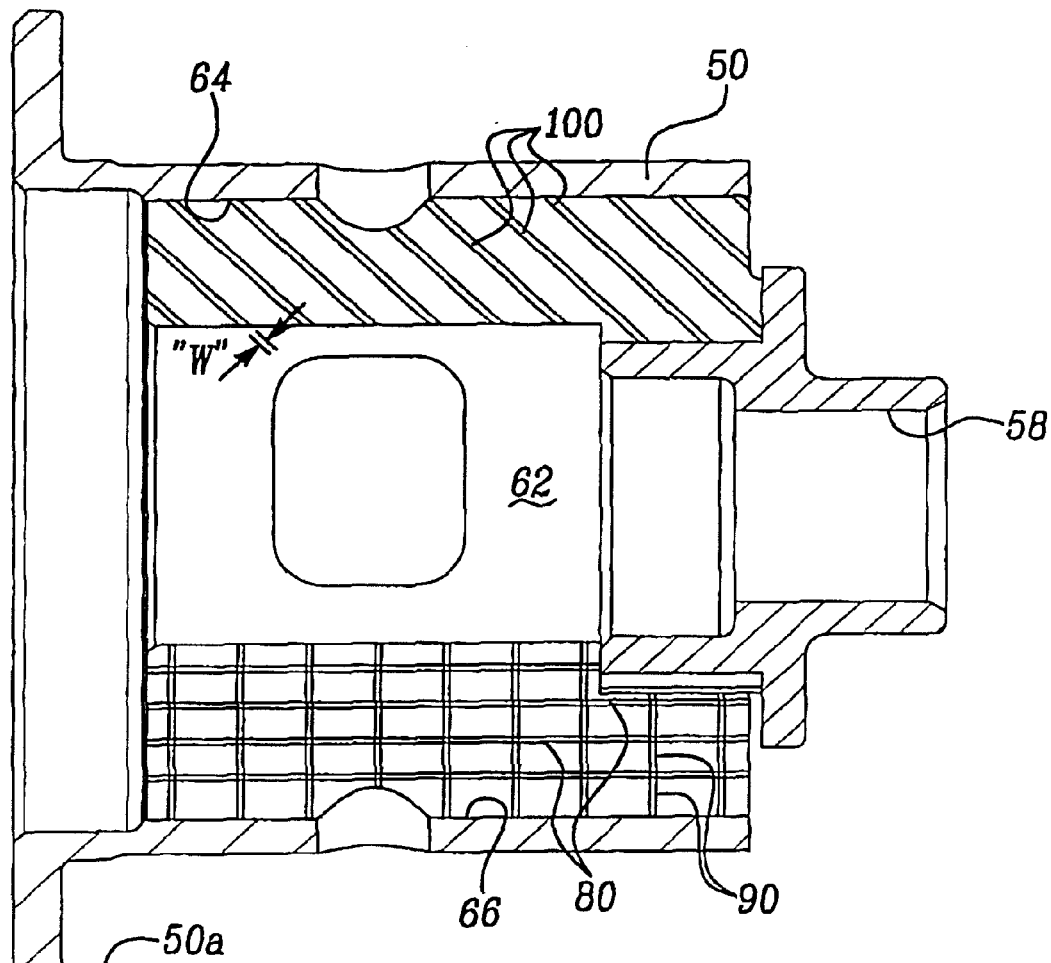
FIG. 6 is another sectional view showing further alternative arrangements for the laser hardened tracks in the gear pockets.

Referring now to FIG. 5, another preferred embodiment of the present invention is illustrated. In this embodiment, circumferential hardened tracks 90 are formed within pockets 64 and 66 of drums 50 which progress radially about the inner radial surface thereof. The hardened tracks 90 are spaced a distance "C" and have a width in the range of 0.5 to 5.0 mm and, more preferably, of approximately 3 mm. As an alternative to the illustrated embodiments, FIG. 6 shows gear pockets 64 having hardened tracks 100 formed in a parallel series of spirals and gear pockets 66 having hardened tracks 80 and 90 in a crisscross configuration (as shown in pocket 66). Furthermore, the hardened tracks may be formed in a combination of those track profiles disclosed, or in other track configurations now known or later developed without deviating from the spirit of the present invention. The particular configuration of the hardened tracks is preferably selected to provide the most suitable arrangement for preventing wear of the pinion gears and/or the differential case.

As opposed to prior art differential cases which utilize carburized or induced hardened pockets in order to provide resistance to the wear that exists between the helical pinion gears and the differential case, the differential case of the present invention disclosed herein utilizes laser generated hardened tracks to allow increased wear resistance at lower cost and in a shorter time. One advantage of these hardened tracks is that there is very little wear of the type inherently associated with non-hardened differential cases used in the prior art. Another advantage of the laser-hardened differential case of the present invention is that the time and expense required to harden differential cases of the prior art is alleviated.

As is not uncommon, any of the configurations disclosed herein work well individually with a given differential assembly but one may be favored over another because of a great number of factors, including but not limited to those mentioned above. In addition, the hardened tracks constructed according to any embodiment of the present invention can be used in a differential assembly to prevent wear to any desired region instead of the pockets if the application dictates such an arrangement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A differential case for a differential assembly comprising a drum having a central chamber and a pocket communicating with said chamber and adapted to support a pinion gear therein, a wall surface of said pocket including a plurality of tracks formed therein for reducing wear between said wall surface and said pinion gear, said tracks having a hardness level which is greater than the hardness level of adjacent portions of said wall surface.

2. The differential case of claim 1 wherein said hardened tracks extend longitudinally along a length of said pocket.

3. The differential case of claim 1 wherein said hardened tracks extend transversely to the axis of said pocket.

4. The differential case of claim 1 wherein said hardened tracks have a width in the range of about 0.5 mm to 5.0 mm.

5. The differential case of claim 1 wherein said hardening tracks are spaced by approximately 3 mm.

6. The differential case of claim 1 wherein the said tracks are formed by a laser beam.

7. The differential case of claim 6 wherein said laser beam is generated by a carbon dioxide laser operating at approximately 5 kilowatts.

8. A differential assembly comprising:
   a differential case having a drum portion formed to include a central chamber and a first and second gear pockets communicating with each other and with said central chamber; and
   a gearset mounted in said differential case and including first and second side gears rotatably supported in said chamber, a first pinion rotatably supported in said first gear pocket and meshed with said first side gear, and a second pinion rotatably supported in said second gear pocket and meshed with said first pinion and said second side gear;
   wherein at least one of said first and second gear pockets includes a plurality of tracks formed on its wall surface having a hardness level which is greater than the hardness level of adjacent portions of said wall surface.

9. The differential assembly of claim 8 wherein said hardened tracks extend longitudinally along a length of said pocket.

10. The differential case of claim 8 wherein said hardened tracks extend transversely to the axis of said pocket.

11. The differential case of claim 8 wherein said hardened tracks have a width in the range of about 0.5 mm to 5.0 mm.

12. The differential case of claim 8 wherein said hardening tracks are spaced by approximately 3 mm.

13. The differential case of claim 8 wherein the said tracks are formed by a laser beam.

14. The differential case of claim 13 wherein said laser beam is generated by a carbon dioxide laser operating at approximately 5 kilowatts.

* * * * *